US006804526B1

(12) United States Patent
Yarkosky

(10) Patent No.: US 6,804,526 B1
(45) Date of Patent: Oct. 12, 2004

(54) METHOD AND SYSTEM FOR REPORTING OUTSIDE TEMPERATURE

(75) Inventor: Mark L. Yarkosky, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 421 days.

(21) Appl. No.: 09/842,590

(22) Filed: Apr. 26, 2001

(51) Int. Cl.[7] .......................... H04Q 7/20; H04Q 7/00; H04M 1/00; H04M 3/42
(52) U.S. Cl. ................... 455/466; 455/11.1; 455/414.3; 455/515; 455/550.1; 455/561; 340/539.28
(58) Field of Search ............................ 455/466, 414.3, 455/11.1, 423, 515, 550.1, 556.1, 556.2, 561; 370/336; 710/100; 380/270; 340/506, 539.28

(56) References Cited

U.S. PATENT DOCUMENTS

| | | | | | |
|---|---|---|---|---|---|
| 4,539,655 | A | * | 9/1985 | Trussell et al. | ............. 710/100 |
| 5,729,540 | A | * | 3/1998 | Wegrzyn | ............. 370/336 |
| 5,890,054 | A | * | 3/1999 | Logsdon et al. | ............. 455/11.1 |
| 6,041,124 | A | * | 3/2000 | Sugita | ............. 380/270 |
| 6,046,674 | A | * | 4/2000 | Irwin et al. | ............. 340/539.28 |
| 6,246,320 | B1 | * | 6/2001 | Monroe | ............. 340/506 |
| 6,275,710 | B1 | * | 8/2001 | Oinonen et al. | ............. 455/466 |
| 6,278,703 | B1 | * | 8/2001 | Neufeld | ............. 370/342 |
| 6,300,871 | B1 | * | 10/2001 | Irwin et al. | ............. 340/539.28 |
| 6,490,455 | B1 | * | 12/2002 | Park et al. | ............. 455/456.4 |
| 6,505,123 | B1 | | 1/2003 | Root et al. | |
| 6,542,752 | B1 | * | 4/2003 | Illidge | ............. 455/458 |
| 2002/0017988 | A1 | * | 2/2002 | Irwin | ............. 340/539 |
| 2002/0073140 | A1 | * | 6/2002 | Chae | ............. 709/201 |
| 2003/0092442 | A1 | * | 5/2003 | Dalal et al. | ............. 455/434 |

FOREIGN PATENT DOCUMENTS

| | | | | |
|---|---|---|---|---|
| EP | 0690639 | * | 1/1996 | ............. H04Q/7/22 |
| ES | 2105960 B1 | * | 3/1998 | ............. E04H/5/02 |

OTHER PUBLICATIONS

Mobile Media Japan: Location–based weather forecast service, http://www.mobilemediajapan.com/newsdesk/locationweather, printed from the World Wide Web on Apr. 26, 2001.
GeepS Introduces Location–based Wireless Technologies on Advance Internet's New Jersey Online for Retailers and Consumers, http://www.mobileoffice.co.za/news_2000/news–06192000_new_jersey_location_services.htm, printed from the World Wide Web on Apr. 26, 2001.
Location–Based Technology Pushes the Edge—Jun. 2000, http://www.telecoms-mag.com/issues/200006/tcs/location/html, printed from the World Wide Web on Apr. 26, 2001.
Proposal to ITU for G3 RTT, TD–SCDMA Radio Transmission Technology for IMT–2000 Candidate submission—Draft V.O.4, Sep. 1998—printed from the World Wide Web on Apr. 26, 2001.
U.S. patent application Ser. No. 10/704,232, filed Nov. 7, 2003.

* cited by examiner

*Primary Examiner*—William Trost
*Assistant Examiner*—Meless Zewdu

(57) ABSTRACT

A method and system for reporting outside temperature. A temperature source continually provides a measure of outside temperature to a base station in a wireless communications system. The base station responsively inserts an indication of outside temperature into control channel messages and broadcasts the control channel messages for receipt by mobile stations being served by the base station. A mobile station receives the control channel messages, extracts the temperature indication from the messages, and continually displays an indication of outside temperature for viewing by a user. Conveniently, the temperature source can be a simple temperature gauge mounted to a base station tower or other entity in or near the cell site being served by the base station, so that mobile stations in the cell site can be made to display the local temperature.

15 Claims, 5 Drawing Sheets

METHOD AND SYSTEM FOR REPORTING OUTSIDE TEMPERATURE

BACKGROUND

1. Field of the Invention

The present invention relates to temperature reporting and more particularly to a method and system for reporting outside temperature for display on a mobile station such as a cellular telephone for instance.

2. Description of Related Art

In a typical cellular radio communications system (wireless telecommunications network), an area is divided geographically into a number of cells and, in turn, sectors, each defined by a radio frequency (RF) radiation pattern from a respective base transceiver station (BTS, or "base station") antenna. The base stations in the cells are in turn coupled to a base station controller (BSC), which is then coupled to a telecommunications switch or gateway, such as a mobile switching center (MSC) for instance. The MSC may then be coupled to a telecommunications network such as the PSTN (public switched telephone network) or the Internet.

When a mobile station (such as a cellular telephone, pager, or appropriately equipped portable computer, for instance) is positioned in a cell, the mobile station communicates via an RF air interface with the BTS antenna of the cell. This air interface communication can occur over control and traffic channels as defined by an accepted protocol.

For instance, in a Code Division Multiple Access (CDMA) system operating according to industry standard IS-2000 (e.g., TIA/EIA Interim Standard IS-2000-5), up to 64 communication channels exist, each distinguished by a unique "Walsh code." The control channels include a pilot channel defined by Walsh code 0, a sync channel defined by Walsh code 32, and a number of paging channels defined by Walsh codes 1 through 7, as necessary. The traffic channels, in turn, are defined by the remaining Walsh codes (up to 62 in total).

Further, in a CDMA system, each physical sector in a cell is distinguished by a PN offset, which defines a sector-specific part of a pseudo-random number. Communications between a mobile station and the BTS on a given channel, in a given physical sector, and on a given carrier frequency, are encoded using the Walsh code of the channel and the PN offset of the physical sector and are then carried on the carrier frequency. Details of the mechanics involved in this coding and communication are well known to those of ordinary skill in the art and are therefore not described here.

The IS-2000 pilot channel is used for establishing signal timing and conveying signal strength measurements to facilitate handoff between sectors. The pilot channel does not carry messages but rather provides a stream that mobile stations can frequently sample to determine how well they can hear a base station. A mobile station will measure the pilot when it initializes and regularly while it's powered up, whether idle or in a call, in search of the strongest sector.

The sync channel is used to convey system identification and other system-specific information to mobile stations, generally to allow mobile stations to establish communication in the sector. For this reason, the sync channel carries one message, the sync channel message, which contains information such as the system time, code and frame timing, an indication of the PN offset for the selected sector, and a system ID number. When a mobile station first powers-on in a CDMA system, it will search for the strongest pilot and then check the synch channel to find out what PN offset it is using to communicate with the base station.

A paging channel, in turn, may be used to page a mobile station in order to determine whether the mobile station is available to receive a call. Further the paging channels may carry system information and call setup orders to facilitate establishment of calls with the mobile station. For instance, the base station may send a general page message over the paging channel, which can direct a mobile station to switch to a designated traffic channel and to alert a user of an incoming call. Once a mobile station finds a pilot and checks the synch channel, the mobile will quickly switch to the paging channel to be able to receive calls.

SUMMARY

The present invention provides a method and system for reporting outside temperature. In accordance with an exemplary embodiment of the invention, a temperature gauge or other temperature source provides a signal indicative of the outside temperature at or near a cell site. In turn, a base station transmits a representation of the outside temperature in an air interface control channel for receipt and presentation by at least one mobile station. In the exemplary embodiment, each recipient mobile station is arranged to extract the outside temperature representation from the control channel and to present an indication of the outside temperature to a user.

The temperature source can take various forms and can be positioned at various locations. However, an optimal location for the temperature source is a location where the outside temperature is representative of the outside temperature in the cell site. Since the base station antenna typically sits at the core of a cell site, the temperature source can be optimally positioned at the base station, such as on the base station antenna tower for instance. That way, the base station can broadcast to the mobile stations in its cell site an indication of the outside temperature at the base station, which can be representative of (even if not identical to) the outside temperature generally in the cell site.

Further, by positioning a temperature source at each base station throughout a region, and by regularly reporting the outside temperature to mobile stations being served by those base stations, a mobile station can regularly receive and display an indication of the outside temperature in each cell site where the mobile station operates.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
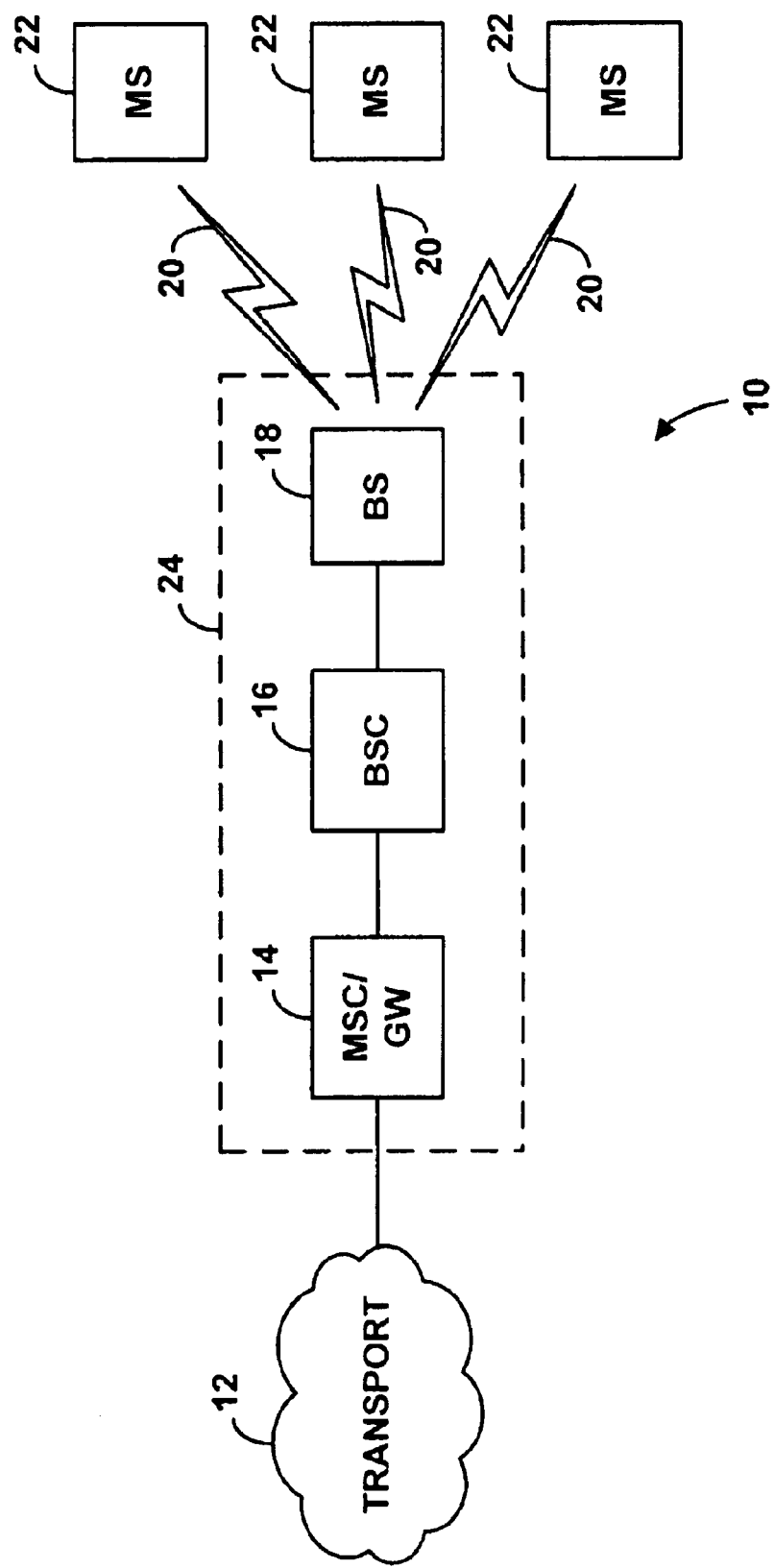
FIG. 1 is a block diagram illustrating a wireless telecommunications network in which the exemplary embodiment can be employed.

Referring to the drawings, FIG. 1 illustrates a wireless telecommunications network 10 in which an exemplary embodiment of the invention can be employed. Network 10 includes a transport network 12 (e.g., the public switched telephone network (PSTN), or the Internet), a mobile switching center (MSC) or other gateway 14, a base station controller (BSC) 16, a base station 18, an air interface 20, and a multiple mobile stations (MS) 22.

Elements 14–18 are considered to be a "radio access network" 24 and are usually owned and operated by a telecommunications service provider. The radio access network functions to interconnect mobile stations 22 with the transport network 12. For instance, when a call for a mobile station comes in from the transport network, gateway 14 may signal to BSC 16, which may in turn signal to base station 18. The base station may then send a signaling message over air interface 20 to the mobile station in an effort to set up and connect the call.

It should be understood that the elements depicted in FIG. 1 and other figures throughout this document are shown for purposes of example only. Variations are possible. For instance, although FIG. 1 depicts only a single base station 18, BSC 16 may in fact function to control multiple separate base stations, each of which may separately define a cell site in which mobile stations can operate. As another example, it is fully possible that the separate BSC and MSC entities could be combined into a single entity and could be co-located or integrated with base station 18. In fact, according to IS-2000, the term "base station" could refer to a cell, a sector within a cell, an MSC or other part of the cellular system. (Thus, for instance, reference to a "base station" could cover the combination of a base station and a base station controller.) Still other variations are possible as well.

As indicated above, base station 18 communicates with mobile stations 22 in various channels over air interface 20. For example, according to IS-2000, the base station will continuously broadcast a pilot signal on the pilot channel (Walsh code 0). Additionally, the base station will continuously broadcast a sync channel message on the sync channel (Walsh code 32). Still further, when a mobile station is actively engaged in a call, it communicates with the base station over a designated traffic channel (any of the remaining Walsh codes).

As further indicated above, when a mobile station is first powered up, it will search for the strongest pilot channel and may responsively establish communication with a base station, such as base station 18 in FIG. 1. According to IS-2000, the mobile station will then enter a "synch channel acquisition substate," in which the mobile station will receive and process a sync channel message. The mobile station will then enter a "mobile station idle state," in which the mobile station will monitor the paging channel(s), receiving and processing paging channel messages.

Figure 2:
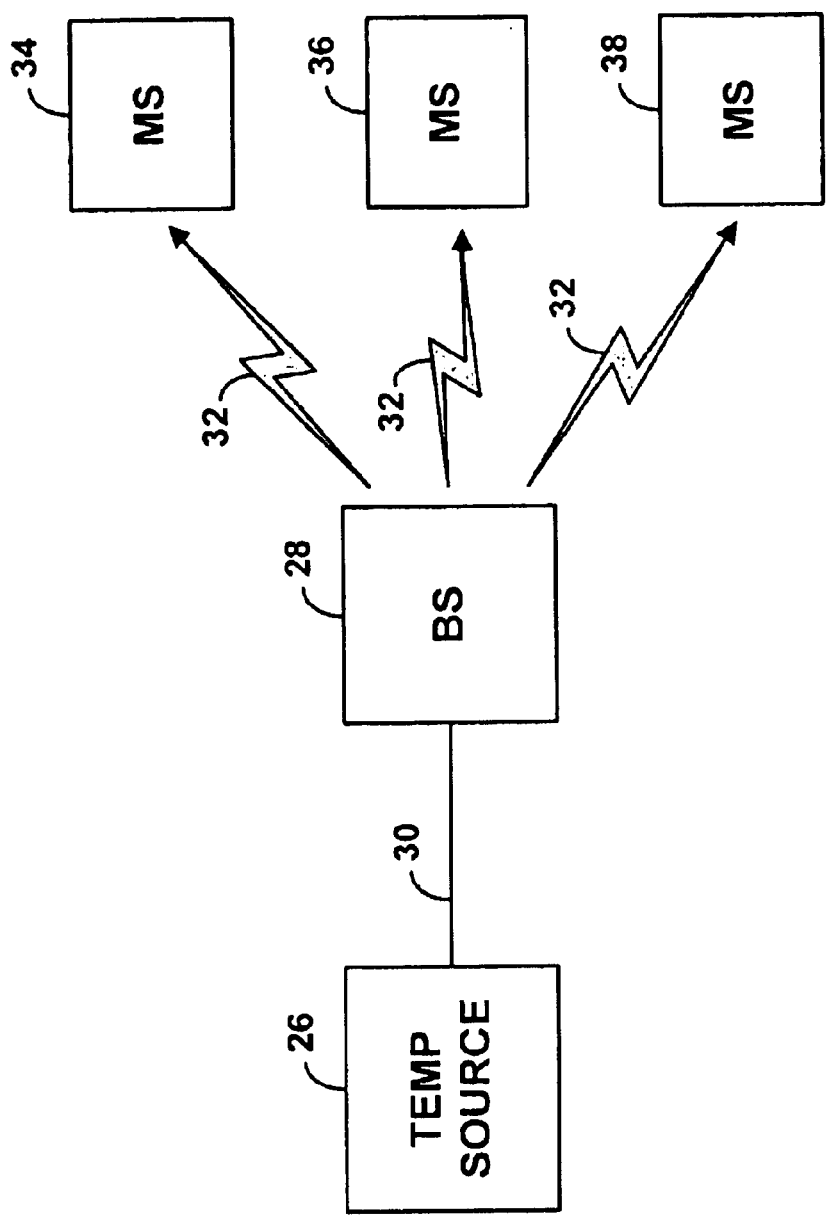
FIG. 2 is a block diagram depicting functional blocks of the exemplary embodiment.

Referring now to FIG. 2, a simplified block diagram is provided to illustrate the functional operation of a temperature reporting system in accordance with the exemplary embodiment. As shown in FIG. 2, a temperature source 26 will output an indication of the current outside temperature. That temperature indication will be provided in turn to a base station 28 over a suitable communications link 30. The base station 28 will then broadcast the temperature indication over an air interface 32 for receipt and display by mobile stations, represented by exemplary mobile stations 34, 36 and 38.

The temperature source 26 can take any of a variety of forms. For example, the temperature source can comprise a simple weather gauge, such as a platinum resistance temperature detector (RTD) or a thermocouple, which provides an output voltage indicative of current temperature. Example platinum RTDs are readily available from companies Such as Minco Products, Inc., of Minneapolis, Minn., or Rosemount Inc., of Chanhassen, Minn. Alternatively, the temperature source can be more complex, such as a digital thermometer that outputs a bit sequence indicative of temperature. Other examples are possible as well.

The communications link 30 over which the temperature indication is provided from temperature source 26 to base station 28 may also take a variety of forms. In the exemplary embodiment, for instance, the link will be a direct wired connection between the temperature source and the base station. However, other examples are possible as well. For instance, link 30 could comprise a landline or wireless network or could be an air interface link such as an infrared or radio frequency link. As another particular example, if temperature source 26 is physically positioned at an MSC, the link between the temperature source and the base station could comprise a standard or proprietary connection from the MSC to a BSC and in turn to the base station.

In the exemplary embodiment, base station 28 will broadcast the temperature indication over air interface 32 in a control channel that is monitored by the mobile stations served by the base station. In this regard, the base station may transmit the temperature indication as a parameter in a standard control channel message or as a specially configured control channel message. Mobile stations may then be arranged to read the temperature parameter from the designated control channel message and to present the temperature to a user.

Figure 3:
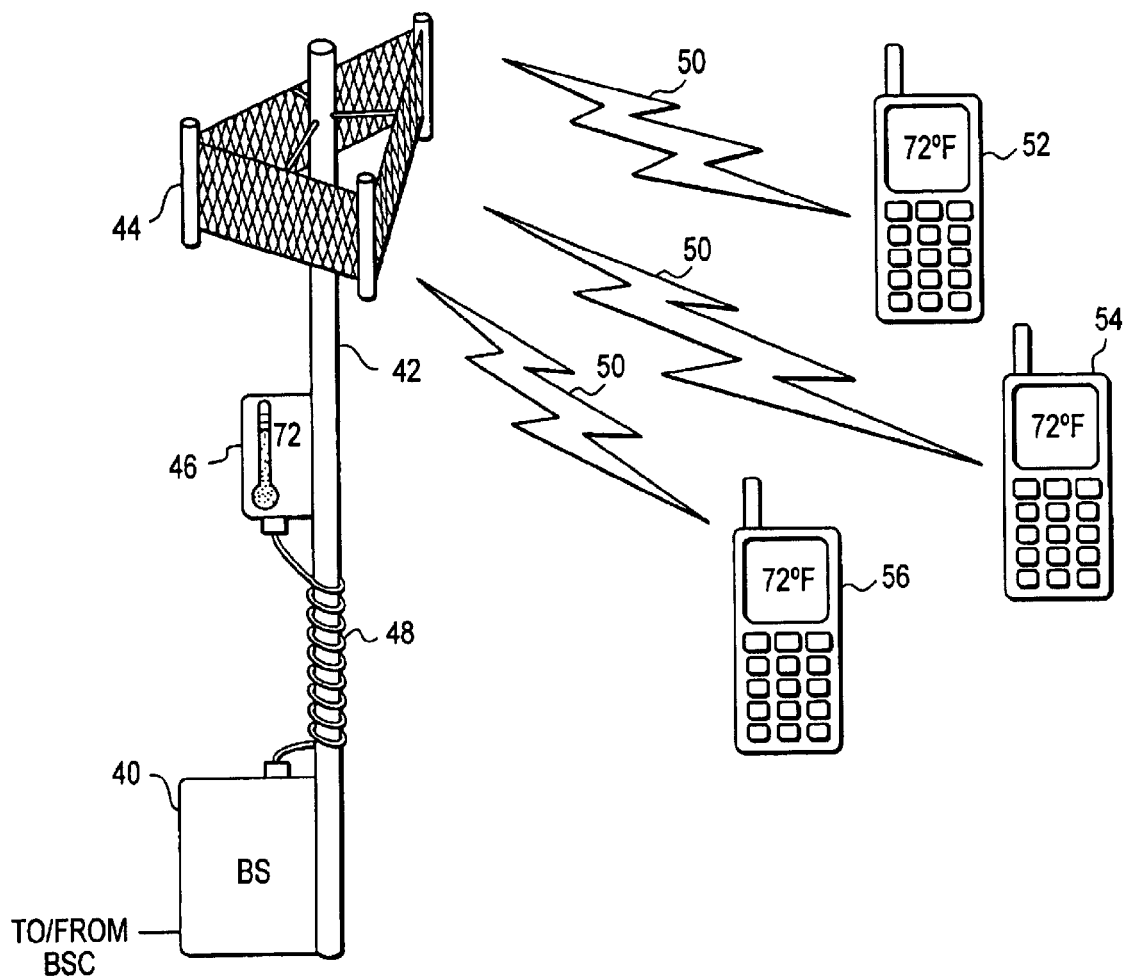
FIG. 3 is an schematic illustration of a base station receiving a measure of outside temperature and reporting the temperature to mobile stations in its cell site.

FIG. 3 illustrates more particularly an exemplary arrangement of this system. As shown in FIG. 3, a base station 40 includes a base station antenna tower 42 supporting a base station antenna 44 (shown as three directional antennae). Mounted to the antenna tower 42 is a temperature gauge 46, such as a platinum RTD (shown fancifully as a mercury thermometer). The temperature gauge is coupled by a wire 48 extending down the antenna tower to the base station. Antenna 44 is in turn shown to be coupled via an air interface 50 with one or more mobile stations, represented by exemplary mobile stations 52, 54 and 56.

In operation, temperature gauge 46 will continually measure the outside temperature at the base station and will continually provide an indication of the outside temperature to the base station, via wire 48. If temperature gauge 46 is a platinum RTD, as indicated above, it will provide an output voltage indicative of the temperature. Base station 40 will then sample the voltage and produce a digital signal (a bit sequence) representative of the temperature. In turn, base station 40 will insert the digital temperature indication as a parameter in a control channel message and broadcast the message over air interface 50 to the mobile stations.

Upon receipt of the control channel message, mobile stations 52, 54, 56 may read the temperature indication parameter from the control channel message. As shown in FIG. 3, the mobile stations may then present the current temperature on their display screens (or in some other form).

To carry out these functions, base station 40 and each mobile station that will be capable of displaying the outside temperature will include a set of suitable logic. The logic could take various forms, whether hardware, firmware and/or software. For instance, the logic may include a processor, a memory and a set of machine language instructions stored in the memory and executable by the processor.

The base station, for instance, may include an analog-to-digital converter for sampling the temperature indication signal provided by the temperature gauge 46, so as to produce a digital representation of the current temperature. In turn, the base station may include a processor that receives the digital temperature representation and inserts the digital temperature representation into a control channel message as a predefined temperature parameter.

It is possible that the base station may have already generated or received (e.g., from the BSC) the control channel message without the temperature parameter. In that case, the base station processor could insert the temperature parameter into the established message. Alternatively, the base station processor may function to establish the entire control channel message, including the temperature parameter. Once the entire control channel message is established, or as the control channel message is being established, the base station can send the control channel message to antenna 44 for transmission of the message over air interface 50 to the mobile stations.

Each mobile station, in turn, may include a programmed processor, arranged to receive and process the control channel message. In particular, the mobile station processor may be programmed to detect the temperature parameter in the control channel message and to responsively read a temperature value from the temperature parameter. The mobile station processor may then responsively send the temperature value to a display unit (such as an LCD display, for instance), to be displayed for viewing by a user.

In this regard, it is commonplace for a mobile station to continually display the current time of day (as indicated by a control channel message) together with a banner such as a service provider name (e.g., "SPRINT PCS") for instance. In the exemplary embodiment, a mobile station will be programmed to continually display the current outside temperature as well or instead. A robust mobile station can include a setup application that allows a user to select the items to be continually displayed, limited by the display size for instance. By way of example, those items may include (i) the outside temperature, (ii) the time of day, and (iii) a banner.

Alternatively, other means for presentation of the temperature are possible as well. For example, the mobile station could provide an audible indication of outside temperature, or both an audio and visual indication. An audio indication could benefit those with restricted eyesight.

Various control channels and control channel messages can be used to carry the outside temperature indication to the mobile stations. Applying IS-2000 for example, two such channels are the sync channel and the paging channel as described above. Within the sync channel, the only message defined by IS-2000 is the sync channel message. Within the paging channel, an exemplary message defined by IS-2000 is known as the "Feature Notification Message." According to the exemplary embodiment, the base station can continually broadcast the temperature indication in both of these messages, so as to convey the current outside temperature to mobile stations both in the synch channel acquisition substate and in the mobile station idle state.

IS-2000 defines the sync channel message to include parameters such as message length, system ID, PN offset, system time (tied to GPS time), local time offset (to use in setting a local clock), a daylight savings time indicator, and the paging channel data rate for the mobile station to use, among others. In accordance with the exemplary embodiment, the sync channel message can be extended to include a predefined temperature parameter, which can carry an indication of temperature as an ASCII character string (such as a number, a degree symbol, and a letter indicating the temperature scale (e.g., "65° F.")). A suitably programmed mobile station can then read the temperature parameter, extract the ASCII character string representation of temperature, and display the character string on a display for viewing by a user.

IS-2000 in turn defines the Feature Notification Message to include an 8-bit "Record_Type" parameter, an 8-bit "Record_Length" parameter, and a variable length parameter for carrying type-specific information (in blocks of 8-bits). According to IS-2000, one of the record-types is "Display" (RECORD_TYPE=00000001), which IS-2000 defines as a record that allows the network to supply display information that may be displayed by the MS. The TYPE-SPECIFIC field can have one or more occurrences of a field called CHARi (8 bits), which is an ASCII representation of a character to be displayed.

According to the exemplary embodiment, the base station can use this message to carry an ASCII representation of the temperature, in a format such as that described above for instance. Further, the base station can continually or periodically send this message over the paging channel. A mobile station can then extract the ASCII temperature from the message and continually display the temperature, until it receives an updated ASCII temperature in a subsequent control channel message.

Another record-type defined by IS-2000 for the Feature Notification Message is "Extended Display," which may in fact be more suitable than the "Display" type, for broadcasting a temperature indication to mobile stations. The Extended Display type defines fields for (i) an indication of the type of display, (ii) a tag indicating the type of display information, (iii) the length of the display text, and (iv) the display information as a sequence of ASCII characters. IS-2000 defines a limited set of 8-bit tags to indicate the type of display information.

In accordance with the exemplary embodiment, another 8-bit tag can be established to indicate temperature display information. The base station can therefore use this record-type to carry an ASCII representation of the temperature, associated with a temperature tag. And a mobile station can be programmed to detect the temperature tag, extract the associated ASCII temperature, and continually display it, again until it receives an updated temperature indication in a subsequent control channel message.

Figure 4:
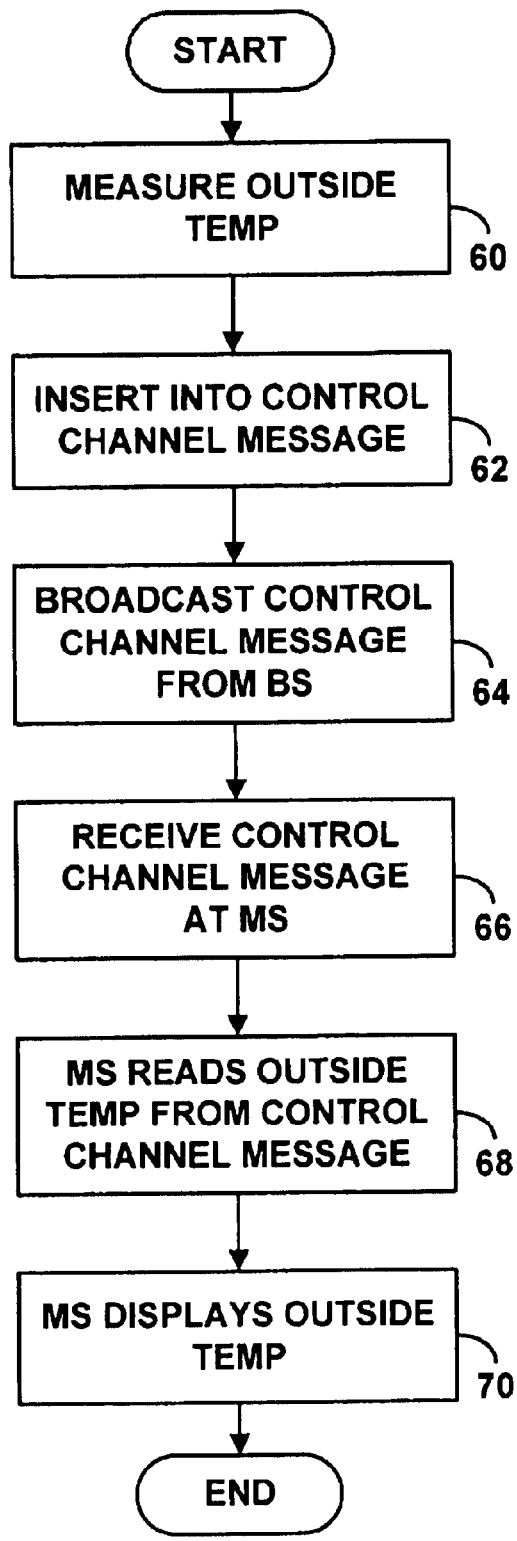
FIG. 4 is a flow chart depicting functions that may be employed in accordance with the exemplary embodiment.

Thus, referring now to FIG. 4, a flow chart is provided to further illustrate operation of the invention in accordance with an exemplary embodiment. As shown in FIG. 4, at block 60, the outside temperature is measured. At block 62, an indication of the outside temperature is then inserted into a control channel message. At block 64, the control channel message is then broadcast over an air interface. At block 66, the control channel message is received at one or more mobile stations. At block 68, each mobile station that is programmed to do so reads the outside temperature from the control channel message. And, at block 70, the mobile station then displays the outside temperature for viewing by a user.

The exemplary embodiment as described is particularly advantageous, because it can facilitate real-time display of the current outside temperature at or near where the mobile station is located. Because most mobile stations are fully functional indoors (and outdoors), the exemplary embodiment can therefore conveniently provide a continuous reading of outside temperature to a user indoors (and outdoors).

In this regard, although the most common type of mobile station is a cellular telephone or a pager, it may be possible to embed a cellular receiver, control logic and a display in various devices so as to establish an independent temperature-display device (mobile station). Examples of such devices can include (i) a refrigerator magnet that displays the outside temperature, (ii) a desk ornament that displays the outside temperature, and (iii) wristwatch that displays the outside temperature. Other examples are possible as well.

Further, this real-time temperature display can occur automatically, without the need for any user-intervention. This is in stark contrast with other methods that are known to display temperature on a mobile station, such as operating a web browser to engage in a data session and to download a weather report web page, or placing a telephone call to a weather reporting service. Automatic display of the current outside temperature is also a great convenience.

Figure 5:
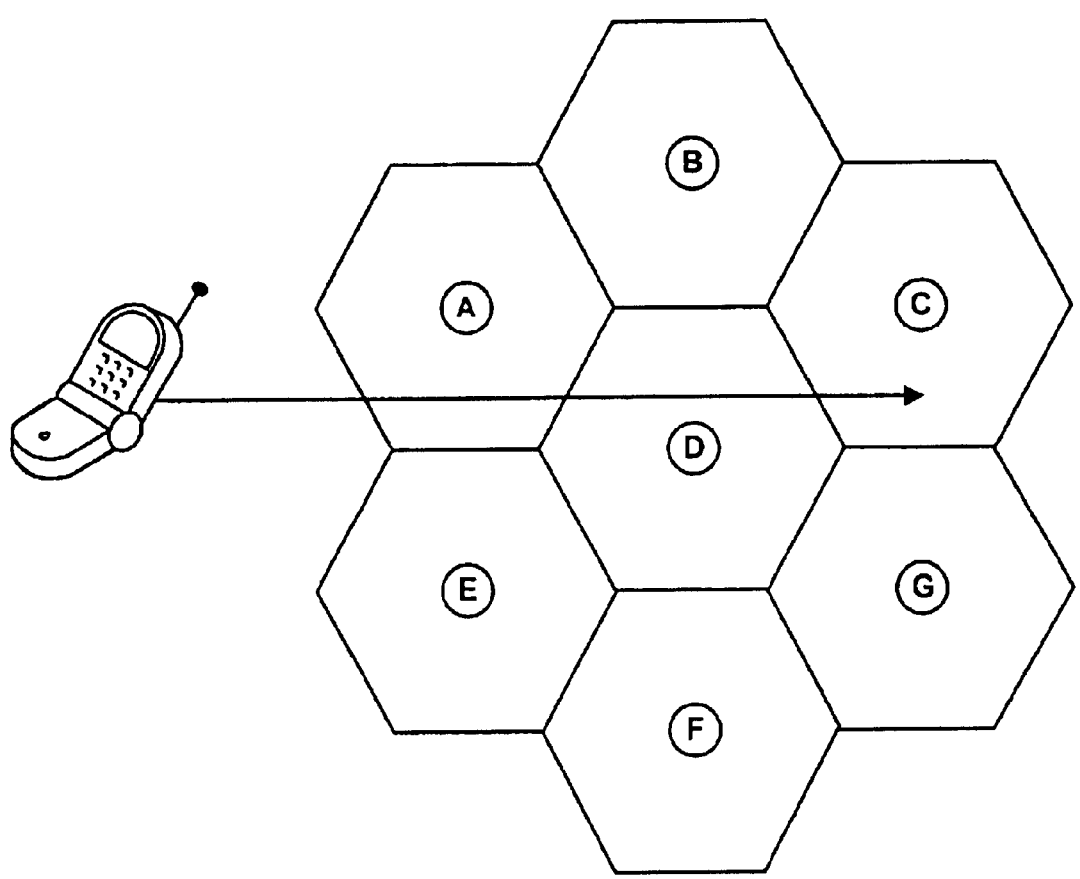
FIG. 5 is an idealized representation of cell sites through which a mobile station may pass as it receives and displays updated reports of outside temperature.

Still further, if multiple base stations throughout a region are all equipped to broadcast an indication of the current outside temperature as described above, a mobile station can move throughout the region and continually receive and display the most current outside temperature, even as it changes from location to location. FIG. 5 illustrates this process schematically.

In particular, FIG. 5 depicts a number of base stations, designated by reference letters A through G. Each base station sits at the core of a cell site defined by a radiation pattern from the respective base station antenna. (The cell sites shown in FIG. 5 are represented by hexagons but would realistically vary in shape, due to factors such as landscape and signal interference.) A mobile station 80 is shown moving along a path through the cell sites defined by base stations A, D and C (referred to as cell sites A, D and C).

As mobile station 80 enters cell site A, it will lock onto a pilot and then monitor the sync channel from base station A. Applying the exemplary embodiment, base station A may receive a measure of the outside temperature in cell site A (e.g., at base station A) and may responsively insert an indication of that temperature into the sync channel message, which it then broadcasts in cell site A. Mobile station 80 may then receive the sync channel message, and extract and display the temperature in cell site A. After processing the sync channel message, mobile station 80 will then begin monitoring paging channel and may receive a Feature Notification Message from base station A, which may again provide the current temperature. Mobile station 80 may then update its temperature display accordingly, each time it receives a new Feature Notification Message.

In turn, as mobile station leaves cell site A and enters and passes through cell site D, a similar process will occur, thereby providing mobile station 80 with a reading of the outside temperature in cell site D. Similarly, as mobile station leaves cell site D and enters and passes through cell site C, a similar process will occur, providing the mobile station with a reading of the outside temperature in cell site C.

An exemplary embodiment of the present invention has been described above. Those skilled in the art will understand, however, that changes and modifications may be made to this embodiment without departing from the true scope and spirit of the present invention, which is defined by the claims.

For example, although the foregoing description provides several examples of how an indication of outside temperature can be provided to a base station, other examples are possible as well. For instance, a temperature gauge can be mounted on a building or other structure that is not part of network 10 and can regularly measure the current outside temperature. The location of the temperature gauge will preferably be at or near the cell site defined by the base station (e.g., at the nearest airport or other weather reporting station). The temperature measured by the gauge can then be reported by any suitable communications link to the base station (or to another entity that establishes a control channel message to be broadcast by the base station).

As another example, although the foregoing description focuses on sending temperature over an IS-2000 control channel such as the sync channel or paging channel, other protocols and/or control channels can be used instead.

Other examples are possible as well.

I claim:

1. A temperature-reporting system comprising:
   a cellular base station;
   a temperature source for establishing a measure of outside temperature, the temperature source being mounted on an antenna tower of the cellular base station; and
   logic for broadcasting the measure of outside temperature in a Feature Notification Message on an air interface paging channel from the cellular base station, for receipt and display of the measure of outside temperature by at least one mobile station being served by the cellular base station, wherein the Feature Notification Message contains a Record Type block, a Record Length block, and a Display or Extended Display block, wherein the Display or Extended Display block holds the digital representation of the measured outside temperature, and wherein the Record Type block holds data indicating that the Display or Extended Display block holds the digital representation of the outside temperature.

2. The system of claim 1, wherein the temperature source comprises a platinum resistance temperature detector.

3. The system of claim 1, further comprising:
   the at least one mobile station, wherein the at least one mobile station is arranged for receiving the measure of outside temperature from the Feature Notification Message and for responsively displaying the measure of outside temperature.

4. A mobile station arranged to display outside temperature, the mobile station comprising:
   a cellular receiver for receiving a Feature Notification Message on an air interface paging channel from a cellular base station, wherein the Feature Notification Message contains a Record Type block, a Record Length block, and a Display or Extended Display block, wherein the Display or Extended Display block holds a digital representation of outside temperature measured by a temperature gauge mounted on an antenna tower of the cellular base station, and wherein the Record Type block holds data indicating that the Display or Extended Display block holds the digital representation of the outside temperature; and
   logic for processing the control channel message to extract from the control channel message the digital representation of the measured outside temperature and for causing an indication of the measured outside temperature to be displayed for viewing by a user.

5. The mobile station of claim 4, wherein the mobile station is a cellular telephone.

6. The mobile station of claim 4, wherein the mobile station is a pager.

7. The mobile station of claim 4, wherein the mobile station is a wristwatch.

8. The mobile station of claim 4, wherein the mobile station comprises a magnet suitable for mounting the mobile station on a refrigerator.

9. The mobile station of claim 4, wherein the mobile station is a desk ornament.

10. A method of reporting outside temperature to a mobile station, the method comprising:

measuring outside temperature at a cellular base station by applying a temperature gauge mounted on an antenna tower of the cellular base station; and sending an indication of the measured outside temperature in a Feature Notification Message on an air interface paging channel from the cellular base station to the mobile station, wherein the Feature Notification Message includes a Record Type block, a Record Length block, and a Display or Extended Display block, wherein the Display or Extended Display block holds temperature display information indicative of the measured outside temperature, and wherein the Record Type block holds data indicating that the Display or Extended Display block holds the temperature display information.

11. The method of claim 10, further comprising:

providing a signal indicative of the measured outside temperature to the cellular base station; and the cellular base station responsively inserting the indication of the measured outside temperature into the Feature Notification Message.

12. The method of claim 11, wherein providing a signal indicative of the measured outside temperature to the cellular base station comprises providing the cellular base station with a voltage indicative of the measured outside temperature.

13. The method of claim 12, further comprising:

the cellular base station producing a digital representation of the measured outside temperature based on the voltage, wherein inserting the indication of the measured outside temperature into the control channel message comprises inserting the digital representation of the measured outside temperature into the control channel message.

14. A method of reporting outside temperature, the method comprising:

measuring outside temperature at a cellular base station by applying a temperature gauge mounted on an antenna tower of the cellular base station;

establishing a digital representation of the measured outside temperature;

generating a Feature Notification Message containing a Record Type block, a Record Length block, and a Display or Extended Display block, wherein the Display or Extended Display block holds the digital representation of the measured outside temperature, and wherein the Record Type block holds data indicating that the Display or Extended Display block holds the digital representation of the outside temperature;

broadcasting the Feature Notification Message on an air interface paging channel from the cellular base station for receipt by at least one mobile station being served by the cellular base station.

15. A method of reporting outside temperature, the method comprising:

measuring outside temperature at a cellular base station by applying a temperature gauge mounted on an antenna tower of the cellular base station;

establishing a digital representation of the measured outside temperature;

generating a Feature Notification Message containing a Record Type block, a Record Length block, and a Display or Extended Display block, wherein the Display or Extended Display block holds the digital representation of the measured outside temperature, and wherein the Record Type block holds data indicating that the Display or Extended Display block holds the digital representation of the outside temperature;

broadcasting the Feature Notification Message on an air interface paging channel from the cellular base station for receipt by at least one mobile station being served by the cellular base station;

receiving the Feature Notification Message at the at least one mobile station;

reading the digital representation of the measured outside temperature from the Feature Notification Message; and displaying the measured outside temperature indicated by the digital representation.

* * * * *